April 3, 1951 H. F. FOWLER ET AL 2,547,381
AUTOMATIC RAIN-WATER CONTROL FOR CISTERNS
Filed June 6, 1945 3 Sheets-Sheet 1
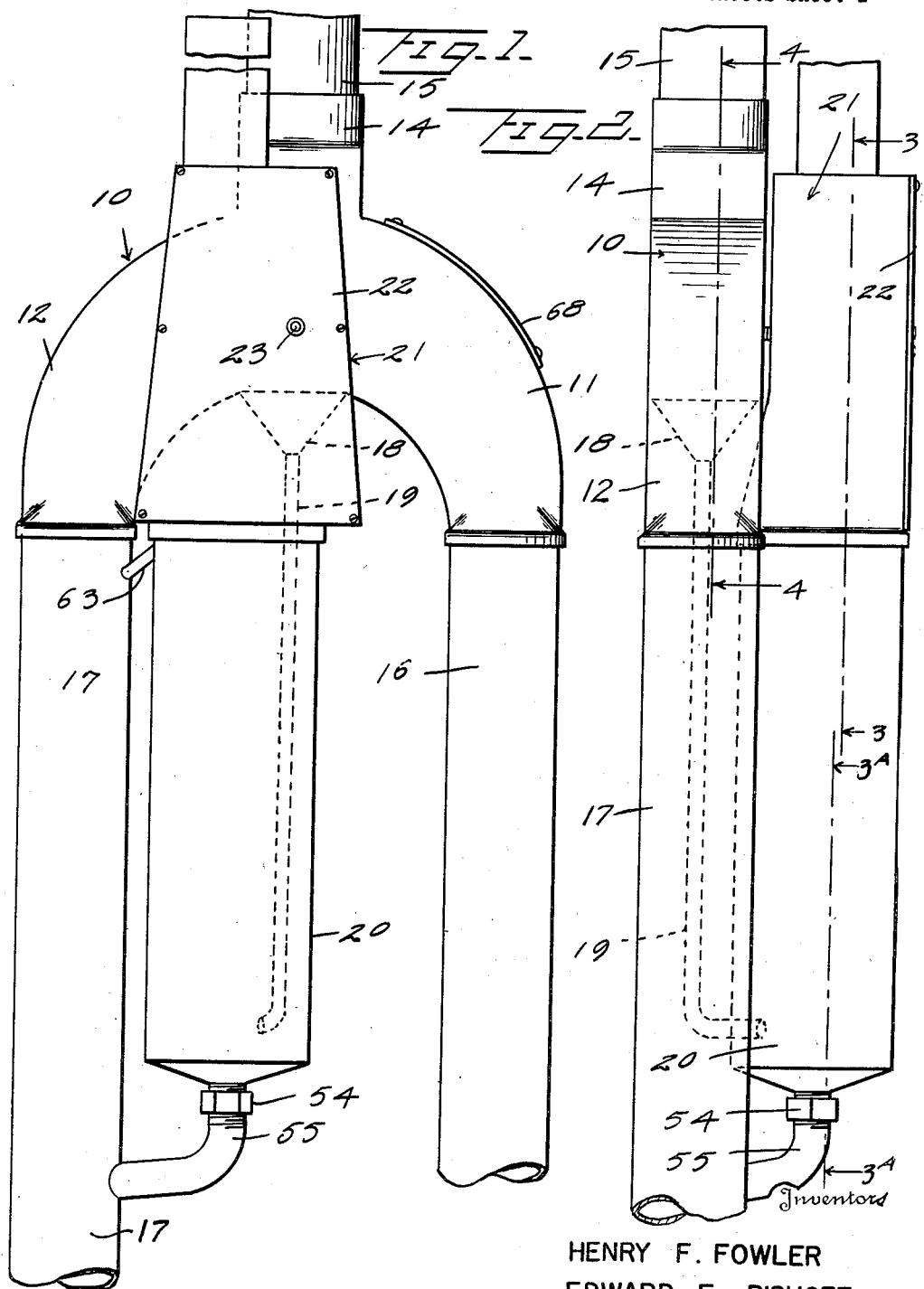
HENRY F. FOWLER
EDWARD E. BISHOFF
By Wilfred E. Lawson
Attorney

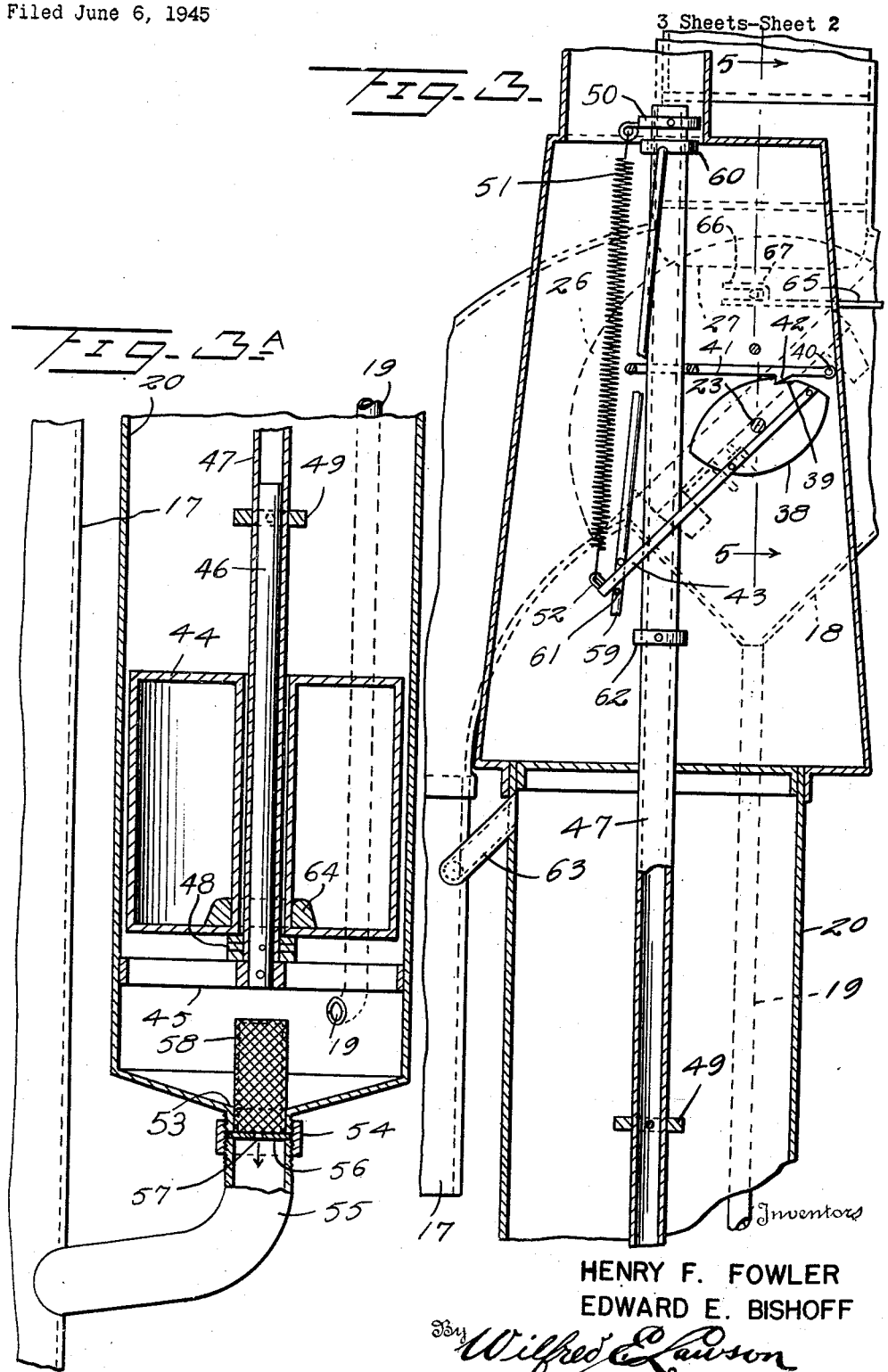

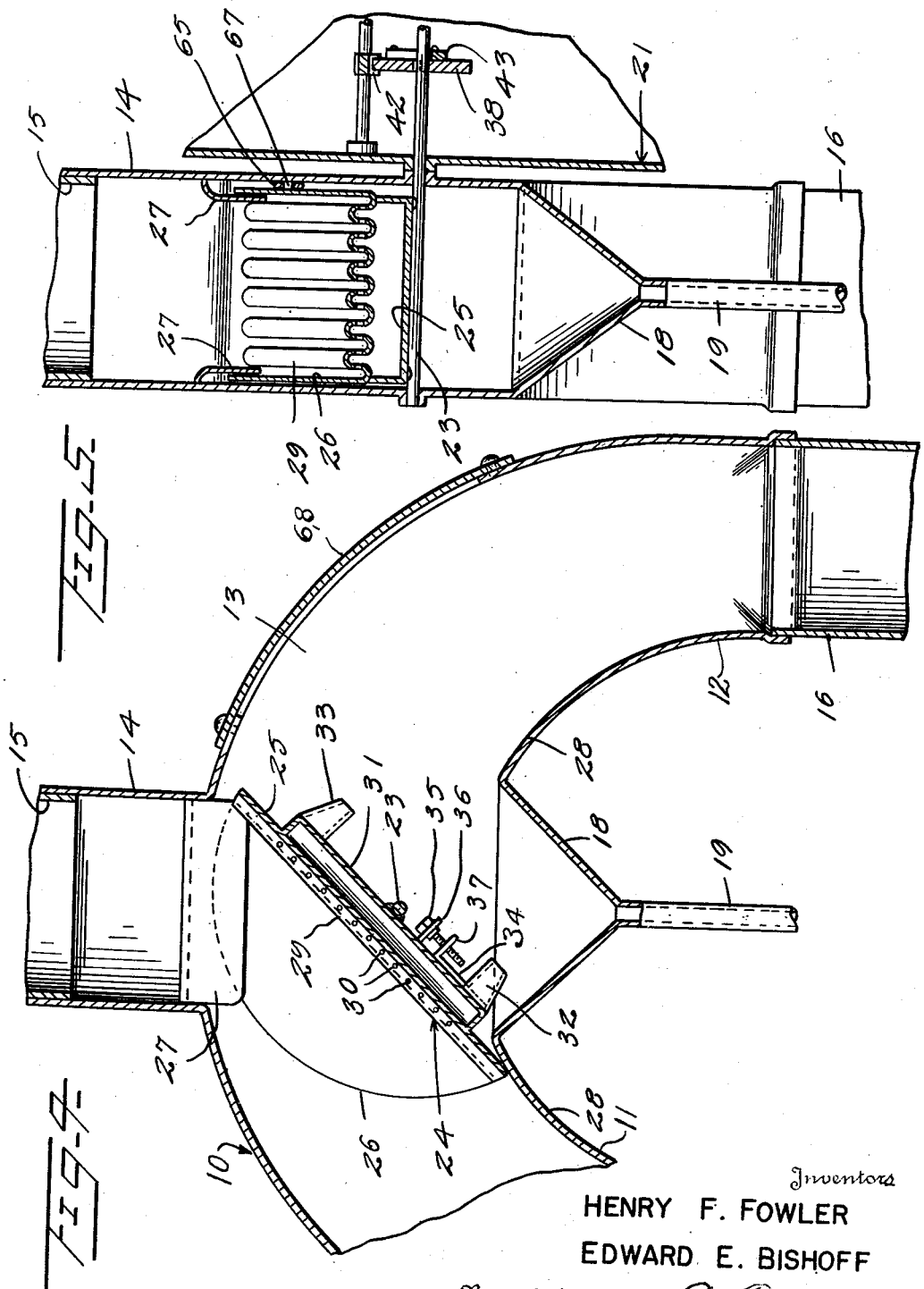

Patented Apr. 3, 1951

2,547,381

UNITED STATES PATENT OFFICE 2,547,381

AUTOMATIC RAIN-WATER CONTROL FOR CISTERNS

Henry F. Fowler and Edward E. Bishoff, Louisville, Ky.; Mary Susan Fowler, administratrix of Henry F. Fowler, deceased Application June 6, 1945, Serial No. 597,910

16 Claims. (Cl. 137—9)

This invention relates to the collection of rain-water in cisterns and is directed particularly to devices for controlling the flow of rain-water from a roof or other collecting surface, to a collection cistern or to a waste drain or conduit.

In the collection of rain-water from the roof of a building or other collection surface it is desirable that the first part of the rain which falls upon such surface be carried off to a waste pipe before allowing any of the water to run into the collecting cistern so as to avoid the carrying of dust and dirt or other matter from the collecting surface into the cistern. By carrying off the first of the rain-water to fall on the collecting surface, such surface will be cooled off thus avoiding, when the surrounding temperature is high and the collecting surface is relatively warm, the carrying of warm water into the cistern.

The present invention has for its primary purpose to provide an automatically operating device for connection with the down spout of a gutter, which will function to carry off to a waste drain a certain proportion of the first rain to fall and to then divert the water passing from the down spout, into a conduit leading to a collecting cistern.

Another object of the invention is to provide a device of the above described character employing an oscillatable deflector element across which the water from the down spout passes, with a timing means, operated by a diverted portion of the water, for effecting actuation of an operating means for the deflector after a predetermined period of time, to divert the collected water from a waste drain to a collecting receptacle.

A still further object of the invention is to provide a control device of the character stated employing two conduits one leading to a waste drain and the other to a collection receptacle such as a cistern, with an oscillatable deflector at the junction of the two conduits for selectively deflecting the flow of rain-water from a down spout to the conduits, with a float operated means for shifting the deflector after a predetermined period of flow of water thereover into the down spout leading to the waste drain.

A still further object of the invention is to provide in a control device of the above stated, a regulatable means associated with the deflector for controlling the flow of water through a portion of the deflector to a chamber in which the float for the control means is housed, whereby to regulate the period of time required for the float to rise to a predetermined position where the deflector will be shifted from water discharging position to water collecting position.

Other objects and advantages of the invention will become apparent as the description of the same proceeds and the invention will be best understood from a consideration of the following detailed description taken in connection with the accompanying drawings forming a part of the specification, with the understanding however, that the invention is not confined to a strict conformity with the showing of the drawings but may be changed or modified so long as such changes or modifications mark no material departure from the salient features of the invention as expressed in the appended claims.

In the drawings:

Figure 1 is a view in front elevation of an automatic rain-water control for cisterns constructed in accordance with the present invention.

Figure 2 is a view in side elevation of the structure.

Figure 3 is a partial section taken substantially upon the line 3—3 of Figure 2.

Figure 3a is a partial section taken substantially on the line 3a—3a of Figure 2.

Figure 4 is a partial sectional view, on an enlarged scale, taken substantially on the line 4—4 of Figure 2.

Figure 5 is a sectional view taken substantially on the line 5—5 of Figure 3.

Referring now more particularly to the drawings it will be seen that the device of the present invention embodies a hollow head unit which is generally designated 10 and which is of arcuate or inverted U-form, being made up of the leg portions 11 and 12, the enlarged connecting or intermediate portion 13 which forms a chamber for the hereinafter described deflector unit, and the upwardly extending delivery pipe 14 which is coupled with a down spout 15 leading from collection troughs or gutters, not shown, such as are supported along the edges or eaves of a roof.

Each of the legs 11 and 12 is connected with a conduit, one, as indicated at 16, being for connection with a cistern or other collection receptacle while the other conduit, designated 17 and connected with the leg 12, is for attachment to a sewer or other waste carrying off means.

Connected in the arch between the legs 11 and 12, with the underside or underwall of the chamber 13, is a collection funnel 18 which leads to the downwardly extending tube 19 which terminates at its lower end at the lower part of a float tank 20 into which the tube 19 opens through the tank wall. As shown the tank 20 is located below the arch of the head unit and to one side of the unit and the upper end of the tank is extended into the lower part of a housing 21 which is connected with the adjacent side of the head and which has upon its outer side the removable cover plate 22 by means of which access may be had to the interior of the housing and the hereinafter described mechanism enclosed therein.

Within and extending across the water receiving chamber 13 of the head unit is a shaft 23 upon which is mounted the water diverting or deflector unit which is generally designated 24. This latter unit comprises the relatively long longitudinally corrugated floor plate 25 which extends transversely of the shaft 23 and which is formed integrally along each of its longitudinal sides, with the upwardly extending arcuate wings 26, each of which lies close to the adjacent vertical side wall of the chamber.

Joined to each side wall of the chamber at the point of connection between such wall and the delivery pipe 14, is a depending apron 27 which is spaced from the adjacent wall of the chamber so as to receive between itself and the adjacent wall the arcuate top edge of the adjacent wing 26. Thus as water flows in through the delivery pipe 14 it will pass over such aprons and be discharged directly onto the plate or top of the deflector unit and the aprons will prevent any of the water passing down between the wings and the walls against which they are positioned.

As shown the plate 25 is of such length that when it is oscillated to either of its two working positions an end edge will rest upon the bottom wall, designated 28, of the chamber 13 between the collector funnel and the nearest leg of the head unit.

Thus it will be seen that the plate 25 at all times covers the top of the funnel 18 and when one end is resting upon the floor 28 of the chamber 13, at one side of the funnel, the other end of the plate will extend across to the underside of the top of the opposite leg of the unit so that all water flowing downwardly through the delivery pipe 14 will be diverted into the leg of the head unit toward which the inclined top side of the plate 26 is directed.

The sides of the corrugations 29 of the plate 26 are provided, through a portion of the length of the plate 25, adjacent to their top edges, with apertures 30. These apertures open into a shallow water pan 31 secured to the underside of the plate 25. Each end of the pan 31 opens into a downwardly and inwardly directed discharge nozzle, one of the nozzles being designated 32 and the other one 33.

The discharge nozzle 32 nearest the end of the pan which is directed toward the leg 12 which leads into the waste discharge conduit 17, is controlled by a slide valve 34 which functions as a timing valve in a manner hereinafter described. This valve is adjustable to regulate the flow of water through the nozzle 32 and the means here illustrated for adjusting the valve comprises a screw 35 which is extended through an ear 36 depending from the underside of the pan and threaded into a downturned portion or ear 37 forming a part of the slide valve 34. Thus it will be seen that as the screw 35 is rotated either clockwise or counter-clockwise, the valve, which is in the form of a flat plate arranged to move transversely of the inlet end of the nozzle 32, will be shifted inwardly or outwardly to respectively close or open the entrance to the nozzle. Thus the flow of water from the pan 31 into and through the nozzle 32 can be controlled.

The opposite nozzle 33 is not controlled by a valve but when the deflector unit is oscillated so that this nozzle 33 is at the lower end of the unit, any water passing through the apertures of the plate 25 into the pan 31, will flow through the nozzle. It will be noted that the length of the pan 31 and the positions of the nozzles 32 and 33, are such that in either working position of the deflector unit one of the nozzles will be arranged to discharge into the open top of the collecting funnel 18 so that water flowing from the nozzle will pass downwardly through the tube 19 and into the tank 20 through the lower part thereof.

The shaft extends at one end laterally into the housing 21 and carries a flat trigger plate 38, in the top edge of which is formed the notch 39. Secured at one end as at 40, to extend above the top edge of the plate 38, is a resilient trigger arm 41 which carries a finger or latching lug 42 which is adapted to engage in the notch 39 when the deflector unit is in water discard position and hold the unit 24 against turning. This trigger arm is arranged to be raised or lifted at the proper time, as hereinafter described, to release the plate and permit the shaft and deflector unit to oscillate to water collecting position.

Secured to the trigger plate 38 to extend beyond one side edge and in the plane of the outer face of the plate, is a crank arm 43 through which the desired oscillatory movement is given to the plate 38 and to the shaft to effect the turning of the deflector unit to water collecting position.

The means for actuating the lever 43 is comprised in the float member 44 which is housed within the tank 20 and is adapted to rise and fall therein with the inflow and outflow of water as hereinafter described.

Within the tank below the float 44 and spaced above the bottom of the tank, is an open frame or spider 45 to the center of which is fixed the vertical stem 46 which passes upwardly through the top of the tank and which has slidably extended thereover, the relatively long sleeve 47 which extends upwardly through the float and to a point a substantial distance above the elevation of the trigger plate and the deflector unit.

Upon the sleeve 47 are fixed the collars 48 and 49 between which the float 44 has movement. When the float is in its down position it rests upon the lower collar 48 and in moving upwardly it has free movement within the tank for a predetermined extent before it contacts the collar 49 and starts to slide the sleeve 47 upwardly on the rod 46.

The upper end of the sleeve 47 has attached to the collar 50, one end of a spring 51. This spring extends downwardly and has its other end attached as at 52 to the outer end of the trigger plate actuating lever 43. In the inoperative or down position of the float 44 the spring is comparatively relaxed but after the float, when raised in the tank by water flowing thereinto and filling the tank, engages the collar 49 and begins to shift the sleeve 47 upwardly, the spring 51 will be placed under constantly increasing tension. However, movement of the plate, shaft and deflector unit, by the tensioned spring will be prevented by reason of the engagement of the trigger finger in the notch 39, of the trigger plate, until the trigger is shifted or raised as hereinafter described.

The lower end of the float tank has an outlet 53 with which is detachably connected the coupling 54 which joins the discharge of the tank with the drain elbow 55 which connects with the waste pipe conduit as shown.

Between the coupling 54 and the end of the tank with which it is connected is a partition plate 56 which has a relatively small aperture 57 therethrough. Secured to this plate to extend upwardly therefrom through the opening 53 and into the lower part of the float tank, is the fine mesh screen cylinder 58, the top end of which is closed. The fine mesh screen together with the small drain aperture 57 functions to prevent the water draining from the tank at too fast a rate. By completely removing the screen 58 and the plate 56 the device is prevented from operating to discharge rain water into the cistern conduit 16. This is done in the event that the cistern becomes filled and it is not desired to add more water thereto which would cause it to overflow.

The upper end of the float tank 20 has connected thereto the small overflow pipe 63 which also leads into the waste pipe 17.

In operation when no water is flowing through the delivery pipe the water deflector or diverting unit 24 will be in the position illustrated, that is, with the plate tilted so that the low end will be directed toward the waste pipe conduit. When in this position the trigger finger 42 will be engaged in the notch 39, the spring 51 will be relaxed, the float tank 20 will be empty and the float 44 will be in the bottom of the float tank. The timing valve 34 will be set in the desired position to regulate the flow of water from the collecting pan 31 through the nozzle 32 to the tube 19 and into the lower part of the tank 20, to determine the length of time which it will take for the float tank to fill and for the float to be raised to a position where it will oscillate the deflector unit 24 from the discard position to the collecting position.

When rain begins to fall upon the roof or other collecting surface from which the rain-water is to be collected and brought to the collecting head 10 through the delivery pipe 14, the first water to flow through the delivery pipe 14 will fall upon the corrugated surface of the plate 25 of the collecting unit and will be discharged therefrom into the leg 12 to the waste pipe 17. At the same time a portion of the water will pass through the apertures 30 into the collecting pan 31 and this will be allowed to drain off through the nozzle 32 and flow downwardly through the tube 19 into the lower part of the tank 20. The inflow of water through the tube 19 will be materially greater than the outflow through the screen 58 and the aperture 57 so that the tank 20 will gradually fill. As previously stated the float 44 will rise freely through the lower part of the tank without affecting the spring 51, until it comes into contact with the movement limiting collar 49. As the tank continues to fill and the float continues to rise, the sleeve 47 will be shifted upwardly and the spring 51 will be placed under continually increasing tension as previously stated.

Adjacent to the spring 51 is a reset rod 59, one end of which is slidably attached as at 60 to the upper end portion of the sleeve 47 while the lower end of the rod is loosely coupled as indicated at 61 with the lever 43.

As the upper end of the sleeve 47 moves upwardly it will slide past the upper end of the rod 59 and after reaching a predetermined position the trigger arm 41 will be engaged by the collar 62 carried on the sleeve, and forced upwardly, thus disengaging the finger 42 from the notch 39 of the plate 38. As the spring 51 is under extreme tension at this time, it will be seen that it will react suddenly and pull the lever 43 upwardly so as to effect the oscillation of the deflector unit over into water collecting position, that is, into the position where the water flowing in through the pipe 14 will be directed through the leg 11 and into the cistern conduit 16. Simultaneously with this movement of the lever 43, the rod 59 will be shifted upwardly to bring the upper end of such rod into close proximity to the collar 50.

After the deflector unit has been oscillated to water collecting position it will maintain such position as long as water continues to flow downwardly through the supply pipe 14 from the gutter down spout. At the same time water will continue to feed through the nozzle 33 into the pipe or tube 19 to keep the float tank 20 filled and the overflow from this tank will pass off through the overflow drain pipe 63.

When the delivery of water to the down spout and into the chamber 13 ceases the water will drain off from the tank 20 through the pipe 55 and the float will gradually lower, this movement being assisted if found necessary, by the attachment of suitable weights 64 to the bottom of the float body 44. The float 44 will also engage the lower collar 48 of the movable member or sleeve 47 and slide the sleeve back down upon the supporting rod 46.

As the float 44 moves downwardly, bringing with it the sleeve 47, the collar 50 at the upper end of the sleeve will engage the upper end portion 69 of the rod 59 and force the rod to move downwardly and at the same time oscillate the lever 43. This will effect the reverse oscillation of the deflector unit 24 until it has been returned to its initial position. When this position is reached the trigger finger, which slides over the top edge of the trigger plate 38, will engage in the notch 39 and thus lock the deflector unit in position where it will be ready for the next downfall of rain to function in the manner above stated.

It was previously stated that the device can be prevented from operating to direct the flow of water into the cistern conduit 16, if desired, by removing the screen 59 and apertured drainage plate 56 so that when the water is delivered through the tube 19 into the tank 20 it will flow off with sufficient rapidity to prevent the tank from filling. Another means is also provided for keeping the device from operating, when desired, in the form of a latch member 65 which is in the form of a reciprocable rod carried by and extending through the wall of the head unit at one side of the chamber 13 and having a forked inner end 66 for slidable engagement with a pin 67 carried upon the outer side of the adjacent wing 26. This rod 65 is available through the outer side of the unit to be shifted as desired for securing or releasing the oscillatable unit 24.

In order to facilitate making adjustments of the timing valve 34, the top part of the leg 11 is provided with a removable door 68. By removing the door, the underside of the oscillatable unit will be brought into view, when the unit is oscillated in the discard or starting position, so that the adjustment screw may be readily reached to effect the shifting of the timing valve.

From the foregoing it will be readily apparent that the device of the present invention will operate entirely automatically to discard a portion of the first of the rain to fall before allowing any of the water to enter the collecting cistern. In this manner all dust and dirt will be removed from the collecting surface and the water in the cistern will be kept clean and pure.

In order to prevent any dirt being washed into the collecting pan 31 through the apertures 30, these apertures are formed through the inclined sides of the ribs or corrugations, near the top edges of the same. Accordingly any dust which may have collected in the bottoms of the channels formed between the corrugations will be washed away and will not enter the collecting pan.

We claim:

1. A liquid flow directing means comprising a housing designed to receive the liquid and having two oppositely disposed outlets and an inlet directed into the upper part of the housing between the outlets, a shaft extending transversely of the housing between the outlets, a deflector plate supported upon said shaft for oscillation to either of two working positions, the deflector plate when in either of the two working positions being disposed obliquely across the line of liquid flow through the inlet to direct the liquid flow into an outlet, means forming a part of the deflector plate for removing a portion of the liquid passing across the plate in both of the two working positions of the plate, a liquid receiver, the liquid removing means having a liquid escape through which the liquid is carried to the receiver, a shiftable means in the liquid receiver adapted to be moved by the rise of liquid in the receiver, and means forming an operative coupling between the shiftable member within the receiver and the deflector plate for effecting the oscillation of the deflector plate to the other working position upon the collection of a predetermined quantity of liquid in the receiver.

2. A liquid flow directing means as set forth in claim 1, with latching means for holding the deflector plate in the first working position and means forming a part of the stated operative coupling between the deflector plate and the shiftable member for releasing said latching means and for imparting a quick snap-over movement to the deflector plate.

3. A liquid flow directing means as set forth in claim 1, with means for variably controlling the rate of flow of liquid from the said collecting means to the receiver when the deflector plate is in the first stated working position.

4. A liquid flow directing means comprising a housing designed to receive the liquid and having oppositely disposed outlets and an inlet arranged to discharge into the housing between the outlets, a shaft oscillatably supported to extend transversely through the housing between the outlets, a liquid deflector plate supported upon the shaft for oscillation in the housing between either of two working positions, the deflector plate when in either of the said positions being disposed obliquely across the line of discharge of liquid from the inlet and having its inclined top surface directed toward an outlet, means for latching the deflector plate in one working position, a liquid receiver, means for deflecting into the receiver a portion of the liquid flowing across the deflector plate, a float member within the receiver, a yieldable coupling between the float member and the deflector plate tending to oscillate the plate upon the rising of the float in the receiver against the restraint of the latching means, and means for releasing the latching means upon the movement of the float in the receiver to a predetermined position to permit the yieldable means to oscillate the plate to the other working position.

5. A liquid flow directing means as set forth in claim 4, with means for maintaining the diversion of a portion of the liquid flowing across the plate, into the receiver after the plate has oscillated to the said other working position, means for draining the receiver after the flow of liquid across the deflector has ceased, and means for returning the deflector plate to the first working position by and upon the return of the float to the lower part of the receiver.

6. A liquid flow directing means as set forth in claim 4, in which the said means for diverting a portion of the liquid into the receiver comprises a receptacle upon the underside of the deflector plate, apertures in the deflector plate permitting a portion of the liquid passing over the deflector plate to pass through into the receptacle, and an outlet for the discharge of the liquid from the receptacle when the deflector plate is in one position for the flow of liquid from the receptacle to the receiver.

7. A liquid flow directing means as set forth in claim 4, in which the said means for diverting a portion of the liquid into the receiver comprises a receptacle upon the underside of the deflector plate, apertures in the deflector plate permitting a portion of the liquid passing over the deflector plate to pass through into the receptacle, an outlet for the discharge of the liquid from the receptacle when the deflector plate is in one position for the flow of liquid from the receptacle to the receiver, and means for controlling the flow of liquid from the outlet for the receptacle to regulate the filling rate of the receiver and the length of time between the start of flow of liquid through the inlet onto the deflector plate and the oscillation of the deflector plate to the second working position.

8. A liquid flow directing means as set forth in claim 4, in which the said means for diverting a portion of the liquid into the receiver comprises a receptacle upon the underside of the deflector plate, apertures in the deflector plate permitting a portion of the liquid passing over the deflector plate to pass through into the receptacle, an outlet for the discharge of the liquid from the receptacle when the deflector plate is in one position for the flow of liquid from the receptacle to the receiver, and means for controlling the flow of liquid from the outlet for the receptacle to regulate the filling rate of the receiver and the length of time between the start of flow of liquid through the inlet onto the deflector plate and the oscillation of the deflector plate to the second working position, and a second discharge outlet for the receptacle arranged to maintain the flow of liquid from the receptacle to the receiver after the oscillation of the deflector plate to the other working position.

9. A liquid flow directing means comprising a housing forming a receiver for liquid and having a pair of oppositely disposed outlets and an inlet discharging downwardly into the housing between the outlets, a shaft extending transversely through the housing between the outlets, a liquid deflector plate supported upon the shaft for oscillation to either of two working positions, a drain funnel in the lower part of the housing beneath the deflector plate, said deflector plate when in either of its working positions being directed obliquely across the line of flow of liquid entering from the inlet and having its low end arranged to direct liquid to one side of said drain funnel into an outlet, a liquid receiver having its lower portion connected with said funnel to receive liquid from the funnel, means for passing a portion of the liquid through the deflector plate into the funnel in both of the two working positions of the plate, latch means for securing the deflector plate in one working position, a vertically shiftable member disposed adjacent to said latch means, a float within the receiver having a lost motion coupling with said vertically shiftable member whereby the float has a period of movement relative to the shiftable member and then effects the shifting of the shiftable member, means carried by the shiftable member for effecting the release of said latching means after a predetermined period of movement of the shiftable member, and a spring mechanism operatively coupled between the shiftable member and the deflector plate to effect the rapid oscillation of the deflector plate to the other working position upon release of the latching means.

10. A liquid flow directing means comprising a housing designed to receive liquid and having oppositely positioned outlets and an inlet arranged for discharge downwardly into the housing between the outlets, a shaft extending across the housing between the outlets, a relatively long deflector plate supported upon the shaft for oscillation in the housing to either of two working positions, the deflector plate when in either of its working positions being directed obliquely across the line of flow of liquid entering the housing from the inlet to discharge the liquid into an outlet, drain means in the lower part of the housing beneath the plate, a liquid receiver having a restricted flow outlet leading to one of the housing outlets, means for collecting a portion of the liquid from the deflector plate and discharging the same into the drain, said drain discharging into the lower part of the liquid receiver, a float within the liquid receiver, a vertically shiftable rod extending through the float and through the upper part of the receiver, the float having free movement upon the rod for a period of its movement in the receiver and then having connection with the rod to shift the latter, a latch member operatively coupled with the deflector plate to maintain the same in one working position, an arm operatively coupled with the deflector plate, a spring connected between an end of the arm and said rod to be placed under tension upon movement of the rod, and means carried by the rod for effecting the release of said latch after said spring has been placed under a predetermined tension.

11. A liquid flow directing means as set forth in claim 10, with means for regulating the flow of liquid from the collector plate to said drain means, said liquid flow regulating means being adjustable to provide for the passage of liquid into the drain means and receiver at a faster rate than the liquid flows through the restricted flow outlet.

12. A liquid flow directing means comprising a liquid receiving casing having oppositely positioned outlets and an inlet discharging downwardly into the casing on a line passing between the outlets, a shaft extending transversely of the casing between the outlets, a deflector plate supported upon the shaft for oscillation to either of two working positions in the casing, the deflector plate when in either of the said working positions extending transversely of the line of flow of liquid entering the casing to direct the flow of the liquid into an outlet, the deflector plate having upwardly extending opposite side wings, an apron secured to each of opposite side walls of the casing and extending downwardly over the adjacent deflector plate wing to direct the liquid onto the deflector plate, the deflector plate being formed with longitudinal corrugations, a water collection receptacle carried upon the underside of the deflector plate, the corrugations having apertures therethrough leading into the receptacle, the receptacle having an outlet adjacent each end of the deflector plate to discharge downwardly in either of the working positions of the plate, an outlet in the lower part of the casing to receive liquid from the receptacle, a liquid receiver, a connection between the lower part of the receiver and the outlet in the lower part of the casing, means for releasably holding the deflector plate in one of its working positions, a float within the liquid receiver, means actuated by said float upon its rise in the receiver to a predetermined position for releasing the said releasable securing means to permit oscillation of the plate to the other working position, and spring means operatively coupled with the deflector plate and placed under tension upon the rise of the float in the receiver for effecting the rapid oscillation of the plate to the said other working position upon release of the plate securing means.

13. A liquid flow directing means as set forth in claim 12, with a drainage connection between the lower part of the liquid receiver and the outlet into which the liquid flows from the deflector plate when the plate is in the first mentioned position, and means for controlling the rate of flow of liquid from said receiver outlet.

14. A liquid flow directing means comprising a housing having a pair of outlets and an inlet, a long straight deflector plate mounted within the housing between the outlets to oscillate on an axis extending across its under side to either of two inclined working positions, the deflector plate when in either of said positions being disposed to receive liquid from the inlet and direct its flow from one end to an outlet, means for diverting through the deflector plate a portion of the liquid flowing over the deflector from the outlet to which the liquid is being directed by the deflector, a receiver for the diverted liquid located between the pair of outlets, and means actuated by the liquid diverted into the receiver for effecting the oscillation of the deflector plate to its other position after a predetermined quantity of the liquid has collected in the receiver.

15. A liquid flow directing means comprising a housing having a pair of outlets and an inlet, the inlet being directed into the housing between the outlets, a deflector plate having a length sufficient to extend from one outlet obliquely through the housing to a point beyond the far side of the inlet from the said one outlet to deflect liquid entering the housing through the inlet, a supporting shaft for and extending transversely of the under side of the deflector plate and oscillatably supported at its ends in opposite walls of the housing, the deflector plate being oscillatable on such shaft to either of two working positions to direct the flow of liquid over its surface to one of said outlets, means releasably holding the deflector plate in one working position, means tending to oscillate the deflector plate against said holding means, means for removing a portion of the liquid flowing over the plate, the means tending to oscillate the plate being operated by the said portion of the liquid removed from that flowing across the plate, and means for releasing the plate holding means to free the plate for oscillation to the other working position after a predetermined amount of liquid has been diverted for a predetermined time from that flowing across the deflector plate.

16. A liquid flow directing means comprising a body formed to provide a liquid receiving chamber, oppositely directed outlets for the chamber and an inlet, a shiftable deflector in the chamber having two working positions and arranged when in either position to receive liquid from the inlet and direct it to an outlet, releasable holding and operating mechanism for and connected with the deflector to shift the deflector from one position to the other when the deflector is released, a liquid receiver below the deflector, said deflector being apertured to divert a portion of the liquid flowing thereover into the receiver, and means actuated by and upon the collection in the receiver of a predetermined quantity of liquid diverted thereinto by the deflector, to release the holding mechanism for the actuation of the deflector to the said other position.

HENRY F. FOWLER.
EDWARD E. BISHOFF.

REFERENCES CITED

The following references are of record in the file of this patent:

UNITED STATES PATENTS

| Number | Name | Date |
|---|---|---|
| 312,120 | Heaton | Feb. 10, 1885 |
| 513,000 | Bays | Jan. 16, 1894 |
| 808,494 | Voorhees | Dec. 26, 1905 |
| 928,846 | Brott | July 20, 1909 |
| 1,124,458 | Kessler | Jan. 12, 1915 |